Figure 5:
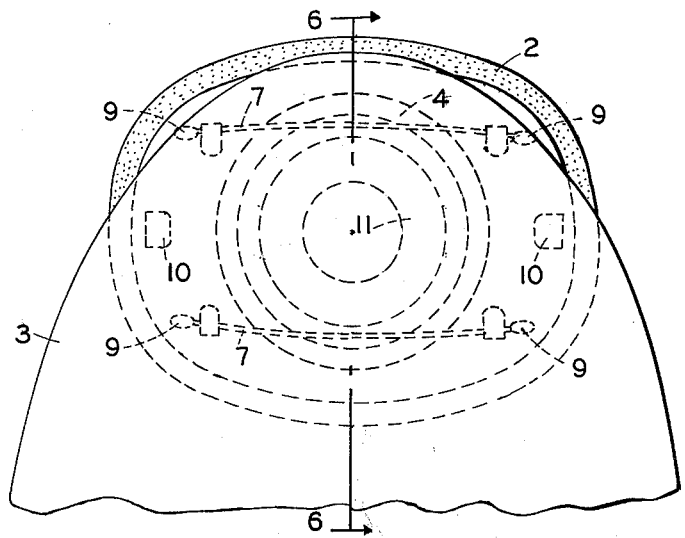

Aug. 13, 1963 E. OROWAN 3,100,488
ENTEROSTOMY APPLIANCE
Filed Dec. 1, 1959 3 Sheets-Sheet 1
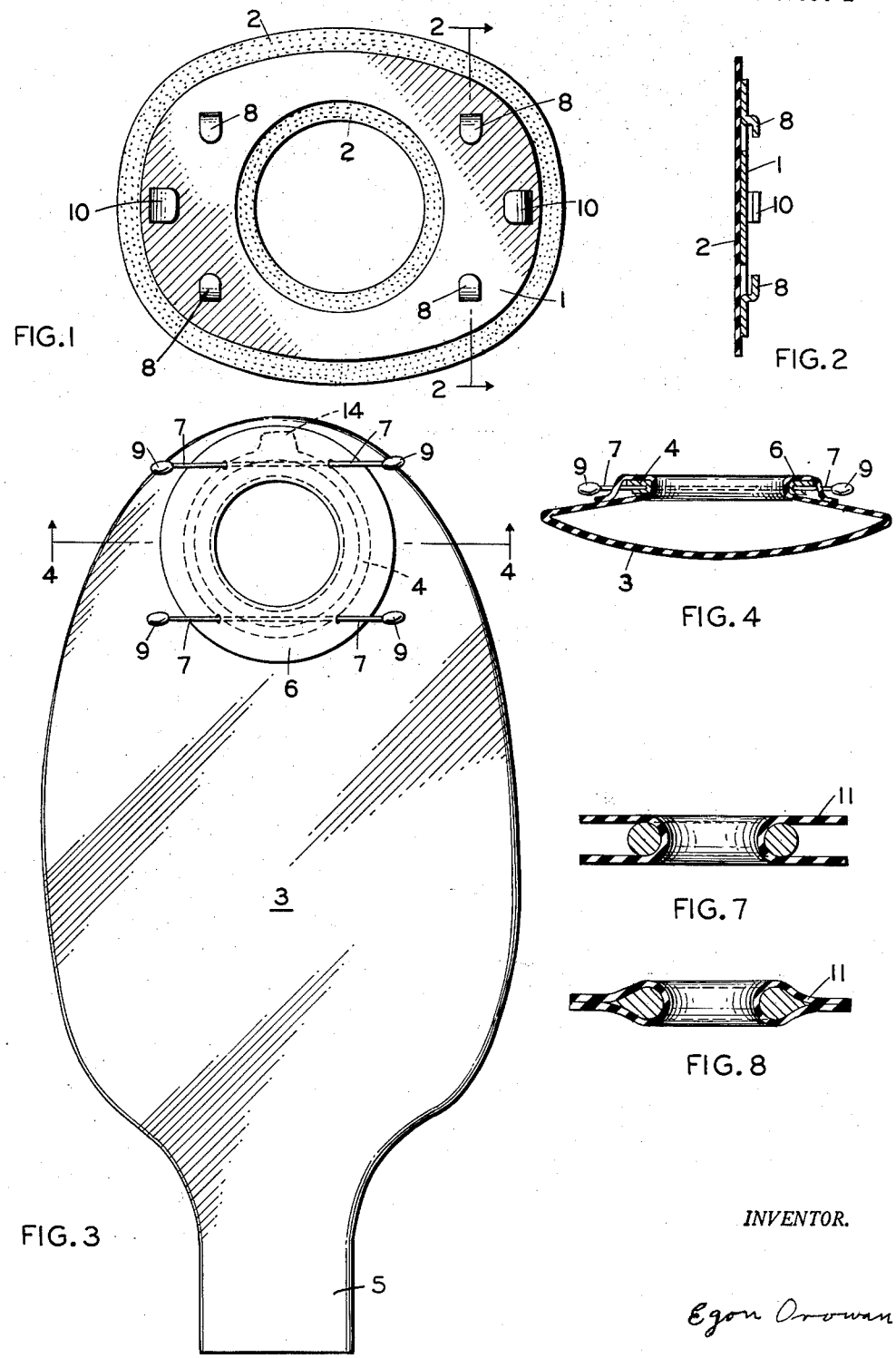
INVENTOR.
Egon Orowan Aug. 13, 1963  E. OROWAN  3,100,488
ENTEROSTOMY APPLIANCE
Filed Dec. 1, 1959  3 Sheets-Sheet 2

INVENTOR.
Egon Orowan

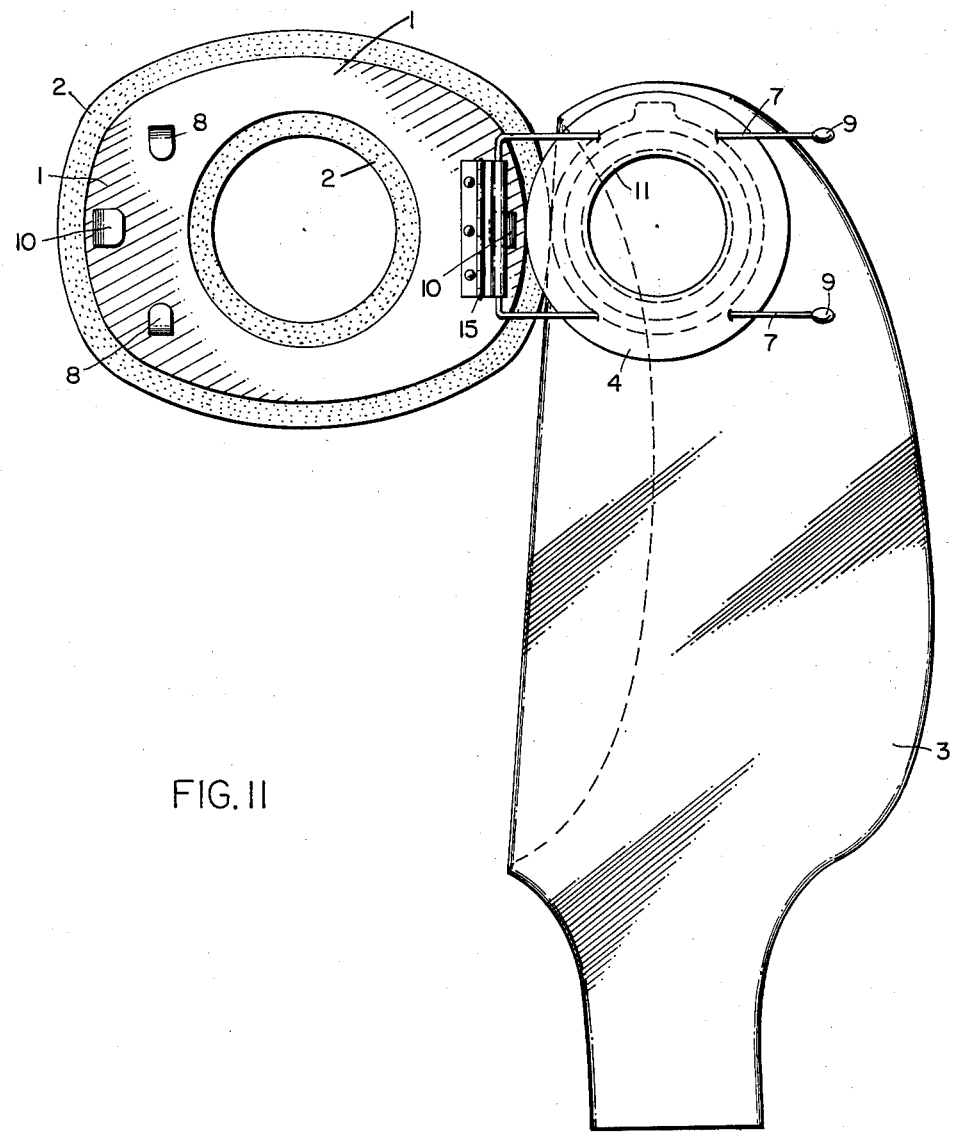
FIG. II

3,100,488
ENTEROSTOMY APPLIANCE
Egon Orowan, 44 Payson Terrace, Belmont, Mass.
Filed Dec. 1, 1959, Ser. No. 856,446
15 Claims. (Cl. 128—283)

The present invention relates to a new type of surgical appliance originally developed for ileostomy patients and offering advantages not hitherto available also for ureterostomy, colostomy, and other types of fistulas discharging through the surface of the body.

The customary appliances consist of a disc with a central opening for the stoma and a pouch-like receptacle attached to the disc. The disc may be secured to the body by a belt, by an adhesive, or both. The pouch is either permanently joined to the disc, or its inlet orifice is pulled upon a short flanged neck on the disc. Since the relatively hard disc cannot be permitted to exert pressure upon the mucosa of the stoma, the hole in it must be large enough to leave a free area of skin around the stoma. In this area the skin is exposed to attack by proteolytic enzymes of the ileal discharge. It can be protected by the application of a hydrophilic colloid, e.g., a vegetable gum; however, this is washed away by the discharge in a relatively short time. In many cases the skin tends to pull away from the disc during bending or other movements, and the moisture penetrating under the disc prevents its re-adhesion to the skin; repetition of this destroys the adhesive bond. If this is counteracted by tightening the belt and pressing the disc more strongly upon the abdomen, the concentrated pressure of the inner rim of the disc may cause damage to skin or stoma occasionally requiring surgical repair.

One purpose of the present invention is to make the receptacle instantly detachable and replaceable while the disc remains secured to the body, so that inspection of the seal and replacement of the protective colloid can be carried out easily and quickly. Another purpose is to cover the protective colloid on the skin around the stoma with a soft sealing cushion, and to provide a recess between the stoma and the sealing cushion in which a sufficient amount of the colloid can be accommodated and protected from dissolution. Another purpose is to make the sealing cushion instantly removable after the pouch is detached and thereby enable the patient to renew the colloid seal within a few minutes while the disc remains attached to the body, in contrast with the existing appliances which have to be entirely removed, cleaned, and re-cemented to the skin once attack upon the skin or penetration under the disc has started, an operation requiring considerable time, various accessories, and facilities not usually available outside the home. Another purpose of the invention is to produce a mild and uniformly distributed pressure by the soft sealing cushion upon the skin and thereby prevent both separation and consequent penetration of the discharge, and local concentration of pressure causing injury. Another purpose is to create a dam of colloid between the discharge and the area of latex cementing under the disc. Another purpose is to establish a strong adhesive bond of moderately moist colloind between the sealing cushion and the skin which may partly or wholly replace cementing of the disc. Another purpose is to facilitate the use of a thin disposable lining inside the pouch, so that this can be emptied instantly by dropping the lining out of it; this makes cleaning of the pouch unnecessary and eliminates the odor problem. By the use of such an instantly disposable lining the appliance becomes eminently suited for colostomy, inaugurating a new method of its management which saves about an hour's work a day and gives complete security to the wearer under all circumstances. Yet another purpose is to make possible the discharge of gas from the receptacle in a deodorized state by an inconspicuous pressure with a finger through the garments.

Figure 6:
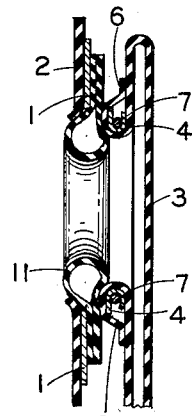
Figure 9:
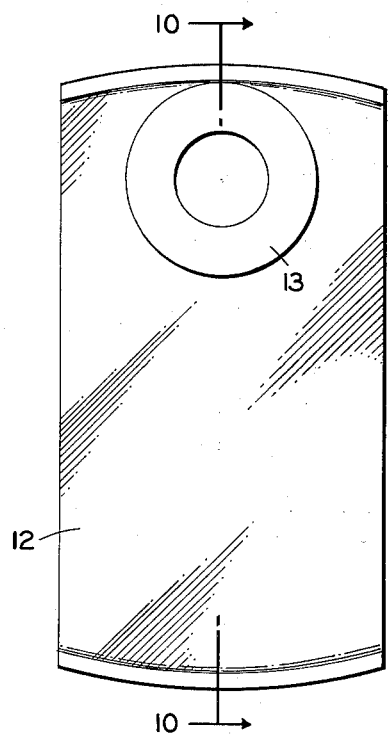
Figure 10:

The design of a practical form of the appliance is shown in the accompanying drawings:

FIG. 1 is a plan view of the disc;
FIG. 2 is a section through the disc;
FIG. 3 is a view of the pouch;
FIG. 4 is a section of the pouch through the center of its inlet orifice;
FIG. 5 is a view of the assembled appliance;
FIG. 6 is a secton of a part of the appliance;
FIG. 7 is a section of one form of the sealing cushion;
FIG. 8 is a section of the same cushion when compressed, and also a section of another type of cushion;
FIG. 9 is a view of the pouch lining, and
FIG. 10 is a section of the pouch lining; and
FIGURE 11 is a view of a form of the appliance in which the orifice ring is hinged to the disc.

In these figures, 1 is the disc which may be made of metal, of a hard polymer, or of any other suitable stiff material. 2 is a lining covering the disc on the side of the body; the lining may be made of rubber or of a soft rubbery polymer. It can be removed when it is worn out and replaced by a new lining cemented to the disc 1. The lining 2 extends beyond the disc both inside its hole and at its outer periphery, protecting the skin from the pressure of the edges of the disc. Alternatively, the disc may be covered entirely with soft rubber, except around the hooks or buttons 8 and 10. In FIG. 3, which is drawn on a slightly smaller scale than FIGS. 1 and 2, 3 is the pouch made of natural or synthetic rubber; 4 is a metal ring attached to its inlet orifice. The ring is fully embedded in rubber, between the pouch and its soft rubber flange 6 which may be an integral part of the pouch or joined to it by cementing, vulcanization, or some similar process. Spring pins 7 are fastened to the ring; they can be engaged in hooks 8 on disc 1 and disengaged from them by finger pressure upon the small buttons 9 at the ends of the pins. The pouch has a discharge outlet 5 at its bottom. The spring pins are shaped so that, when they are engaged in hooks 8, ring 4 and with it the orifice of the pouch is pressed upon the disc with a pressure sufficient for producing a reliable seal. Between disc 1 and pouch 3 is compressed the peripheral part of the sealing cushion 11 which acts as a sealing gasket between disc and pouch. The central part of the cushion is mildly pressed upon the skin around the stoma within the hold of the disc, establishing a seal around the stoma through the colloid between the skin and the cushion, and also through the colloid in the narrow ring-shaped space between the stoma and the sealing cushion. One form of the sealing cushion is shown in FIG. 7 in section; the wall thickness is greatly exaggerated. It is made of soft rubber or neoprene of thickness between 10 and 25 thousandths of an inch. When compressed between the disc and the orifice of the pouch, it assumes the shape shown in FIGS. 6 and 8; it exerts a pressure upon the skin mainly through its elasticity. Alternatively, a peripherally sealed air-cushion of the section shown in FIG. 8 can be used, made of rubber or neoprene film of thickness between 3 and 8 thousandths of an inch. Instead of air, the thin-walled sealed cushion may be filled with a liquid, a jelly, or a viscous polymer such as silicone putty or polyisobutylene. According to the curvature and softness of the abdominal wall around the stoma, the sealing cushion must be more or less inflated. A method of regulating the degree of inflation is indicated in FIGS. 7 and 8. A suitable amount of silicone putty is kneaded into a ring and inserted into an unsealed cushion as shown in FIG. 7. When the cushion is locked into the appliance, the silicone ring flows apart and fills the cushion like a liquid (FIG. 8); since the margins of the cushion are compressed, the silicone cannot flow out.

For different purposes and different conditions sealing cushions of different material and design can be used. It is a particular advantage of the appliance that the same disc and pouch can be used for practically all types and sizes of stoma; individual adaptation is obtained through the proper diameter, thickness, and type of the sealing cushion. Since the cushion is a small and inexpensive item, the user can try several sizes and choose the most suitable one. The flexibility of the appliance is of particular value for post-operative purposes since the stoma can be inspected, treated, and medication applied without removing the disc or any other disturbance to the patient.

The complete appliance as in use is shown in FIGS. 5 and 6 in approximately natural size; however, the thicknesses are increased by a factor of approximately 3 in FIG. 6 in order to facilitate the reproduction of the drawing. In both figures the lower part of the pouch is omitted.

The appliance is used in the following manner. First, the disc is cemented to the skin with a latex-base cement, a double-sided adhesive tape, or karaya gum. It is secured by a belt fastened to hooks 10, and then the protective colloid (preferably karaya gum) is applied in powder form to the area of skin between the stoma and the inner rim of the disc. The sealing cushion is now laid upon the skin and the disc; it centers itself automatically even if the disc has not been accurately positioned or if it has been displaced relatively to the stoma by the pull of the belt. Finally the pouch is locked to the disc by pressing together the buttons 9 on the corresponding ends of pins 7 and dropping the pins into hooks 8 on the disc.

Instead of using hooks and pins as shown in the figures, ring 4 can be hinged to the disc at 15 as shown in FIG. 11 on one side of the opening and locked to the opposite side, for instance, with pins 7 and hooks 8 in the same way as in FIGS. 1, 3 and 5. In this case the pouch opens like a door and remains swinging on the disc; if the hinges are open, the pouch can be lifted out of them when desired. Naturally, any other means for locking the pouch to the disc and establishing a pressure between them can be utilized. For instance, rubber flaps can be attached to the inlet orifice of the pouch and buttoned to the disc by hooks or buttons.

An advantage of the design according to the present invention is that the pouch can be provided with a disposable lining. One type of lining is shown in FIG. 9 in plan view and in FIG. 10 in section. The lining 12 consists of very thin polyethylene or polyvinylidene chloride film; it is provided with a flange 13, preferably of slightly thicker material, attached to the inlet orifice. In FIG. 10 the thickness of the film is greatly exaggerated for easy reproduction of the drawing. The lining is supplied folded into a number of vertical accordeon-folds, so that it slips directly into the pouch while the flange 13 remains outside and is compressed between the stiffened orifice of the pouch and the disc when the appliance is closed. The lining unfolds as it fills up. When used with a lining, the pouch is provided with a bottom outlet shorter and wider than that shown in FIG. 3; it is closed with a clip. When the pouch is unlocked from the disc and its outlet opened, the lining drops out, and another lining can be inserted within seconds. The use of a lining is of particular advantage in the case of colostomy, eliminating odor problems and the need for cleaning the pouch. When used as a colostomy appliance, the stiffening ring 4 of the pouch orifice can be provided with a small tab 14 at its highest point. If the tab is pulled outwards, away from the body, the top part of the orifice ring 4 is lifted slightly off its seat on the disc and on the sealing cushion, and gas can escape. A ring of fluffy cotton or similar material, applied around the neck of the appliance between disc and pouch can be used for deodorizing the escaping gas and stopping any droplets that may escape with it.

What is claimed is:

1. An appliance for ileostomy, ureterostomy, colostomy and other fistulas, comprising a disc with an opening for the stoma, a receptacle with a stiffening ring around its receiving orifice, and means releasably locking the stiffening ring to the disc, said means incorporating a springy component elastically yieldably pressing the stiffening ring to the face of the disc, thereby establishing a seal between the disc and the receptacle.

2. An appliance for ileostomy, ureterostomy, colostomy and other fistulas, comprising a disc with an opening for the stoma, a receptacle with a stiffening ring around its receiving orifice, a sealing cushion having an opening for the stoma smaller than the opening of the disc and adapted to cover the skin around the stoma within the opening of the disc, and extending outwards beyond the periphery of said opening, and means releasably locking the stiffening ring to the disc and compressing the margin of the cushion between the disc and the stiffening ring, thereby holding the cushion in place and establishing a seal between the disc and the receptacle.

3. An enterostomy appliance according to claim 1, said releasable locking means comprising metal springs fastened to the orifice of the receptacle and engaging into catches on the disc.

4. An appliance for ileostomy, ureterostomy, colostomy and other fistulas, comprising a disc with an opening for the stoma, a receptacle with a stiffening ring around its receiving orifice, a hinge connecting the disc with the ring, and a releasably locking device for closing the orifice ring upon and pressing it to the face of the disc.

5. An enterostomy appliance according to claim 2, said cushion comprising a ring-shaped sealing cushion of thin rubbery material filled with a gas.

6. An enterostomy appliance according to claim 2, said cushion comprising a sealing cushion of thin rubbery material filled with a liquid.

7. An enterostomy appliance accordance to claim 2, said cushion comprising a sealing cushion of thin rubbery material filled with a jelly.

8. An enterostomy appliance according to claim 2, said cushion comprising a sealing cushion filled with a viscous polymer.

9. An enterostomy appliance according to claim 1 comprising a tab connected with the orifice ring of the receptacle for lifting said ring off the disc without unlocking the appliance.

10. An appliance for ileostomy, ureterostomy, colostomy and other fistulas, comprising a disc with an opening for the stoma, a receptacle with a stiffening ring around its receiving orifice, a disposable liner for said receptacle provided with a flange attached to the receiving orifice of the liner, and means for releasably locking the stiffening ring to the disc with the flange of the liner compressed between the disc and the ring, thereby establishing a seal between the disc and the receptacle.

11. An appliance for ileostomy, ureterostomy, colostomy and other fistulas, comprising a disc with an opening for the stoma, a receptacle, a removable sealing cushion having an opening for the stoma smaller than said opening in said disc and adapted to cover the skin around the stoma within the opening in the disc, said cushion extending outwardly beyond the hole in the disc, and means for releasably locking said receptacle to said disc and for pressing the margin of said cushion to said disc to hold the cushion in place and provide a seal between the cushion and the disc.

12. An enterostomy appliance according to claim 10, wherein said disposable lining comprises polyethylene film.

13. An enterostomy appliance according to claim 10, wherein said disposable lining comprises polyvinylidene chloride film.

14. An enterostomy appliance according to claim 10.

said receptacle being provided with a bottom outlet wide enough for the lining to pass through when full.

15. An enterostomy appliance according to claim 10, said receptacle being closed at the bottom and provided with an inlet orifice large enough for the lining to pass through when full.

References Cited in the file of this patent

UNITED STATES PATENTS

| | | |
|---|---|---|
| 2,129,054 | Geisler | Sept. 6, 1938 |
| 2,595,934 | Ginsburg | May 6, 1952 |
| 2,638,898 | Perry | May 19, 1953 |
| 2,662,525 | Priebe | Dec. 15, 1953 |
| 2,684,675 | Perry | July 27, 1954 |
| 2,869,548 | Mason | Jan. 20, 1959 |
| 2,958,326 | Nelsen | Nov. 1, 1960 |
| 2,973,759 | Plymale | Mar. 7, 1961 |